US010558616B2

(12) United States Patent
Shin et al.

(10) Patent No.: US 10,558,616 B2
(45) Date of Patent: Feb. 11, 2020

(54) METHOD AND APPARATUS FOR PARTIAL GARBAGE COLLECTION IN FILESYSTEMS

(71) Applicant: RESEARCH & BUSINESS FOUNDATION SUNGKYUNKWAN UNIVERSITY, Suwon-si (KR)

(72) Inventors: Dongkun Shin, Seoul (KR); Hyunho Gwak, Bucheon-si (KR)

(73) Assignee: Research & Business Foundation Sungkyunkwan University, Suwon-si (KR)

( * ) Notice: Subject to any disclaimer, the term of this patent is extended or adjusted under 35 U.S.C. 154(b) by 653 days.

(21) Appl. No.: 14/980,954

(22) Filed: Dec. 28, 2015

(65) Prior Publication Data
US 2016/0188462 A1    Jun. 30, 2016

(30) Foreign Application Priority Data

Dec. 26, 2014    (KR) .......................... 10-2014-0190885

(51) Int. Cl.
*G06F 16/17*    (2019.01)
*G06F 16/11*    (2019.01)
*G06F 12/02*    (2006.01)

(52) U.S. Cl.
CPC ...... *G06F 16/1727* (2019.01); *G06F 12/0269* (2013.01); *G06F 16/113* (2019.01); *G06F 16/119* (2019.01); *G06F 16/122* (2019.01)

(58) Field of Classification Search
USPC ........................................................ 707/820
See application file for complete search history.

(56) References Cited

U.S. PATENT DOCUMENTS

| 8,285,869 B1 * | 10/2012 | Graetz | G06F 11/1402 707/999.202 |
| 2014/0013051 A1 * | 1/2014 | Qian | G06F 3/0607 711/115 |
| 2014/0101373 A1 * | 4/2014 | Lee | G06F 3/0655 711/103 |

FOREIGN PATENT DOCUMENTS

| KR | 10-2011-0098279 A | 9/2011 |
| KR | 10-2013-0050124 A | 5/2013 |
| KR | 10-2014-0040998 A | 4/2014 |

OTHER PUBLICATIONS

Hyunho Gwak et al., "Partial Garbage Collection Technique for Improving Write Performance of Log-Structured File Systems", Korea Computer Congress 2014, Jun. 25, 2014.
(Continued)

*Primary Examiner* — James Trujillo
*Assistant Examiner* — John J Morris
(74) *Attorney, Agent, or Firm* — NSIP Law

(57) ABSTRACT

A computing device includes a storage device in which a program for operating a file system is stored, and a processor configured to execute the program stored in the storage device wherein, in response to execution of the program, if a write request upon a file to be stored in the storage device is generated, the processor calculates, based on one or more file write methods included in the file system, an overhead of each of the one or more write methods, selects a file write method having the smallest overhead among the one or more file write methods, and records the file in the storage device by using the selected file write method, the one or more file write methods include slack space recycling (SSR), internal-segment-copying-based garbage collection and external-segment-copying-based garbage collection.

11 Claims, 5 Drawing Sheets

(56) References Cited

OTHER PUBLICATIONS

Hyunho Gwak et al., "Partial Garbage Collection Technique for Improving Write Performance of Log-Structured File Systems", Journal of KIISE, vol. 41, No. 12, Dec. 16, 2014.

* cited by examiner

METHOD AND APPARATUS FOR PARTIAL GARBAGE COLLECTION IN FILESYSTEMS

CROSS-REFERENCE TO RELATED APPLICATION

This application claims the benefit under 35 USC 119(a) of Korean Patent Application No. 10-2014-0190885 filed on Dec. 26, 2014, in the Korean Intellectual Property Office, the entire disclosures of which are incorporated herein by reference for all purposes.

TECHNICAL FIELD

The embodiments described herein pertain generally to a method and an apparatus for partial garbage collection in a file system.

BACKGROUND

Recently, as flash storage devices such as a solid-state drive and a SD (secure digital) card become popular, there is an ever increasing demand for a file system suitable for the characteristics of the flash storage devices.

A file system mainly used in a flash storage device is a log-structured file system. Unlike a typical file system such as EXT 4 (extended file system 4) or the like using an in-place update approach, the log-structured file system employs an out-of-place update mechanism whereby, when updating data included in a previously stored file, a previously recorded block is invalidated and newly updated data are sequentially stored in a new block. Thus, in the log-structured file system, small random write requests can be collected and processed as a single sequential write request. Further, in the log-structure file system, the sequential write operation can be performed on a segment-by-segment basis. Here, the segment is a set of consecutive blocks. Thus, the log-structured file system is suitable for a flash storage device which has higher write and read speeds for a file than those of other existing storage devices and is capable of performing parallel processing.

To perform the sequential write operation on the basis of segments successfully, the log-structured file system performs a garbage collection method of creating a new segment by collecting invalid blocks. When performing the garbage collecting operation, however, the log-structured file system may suffer deterioration in write performance due to a delay in the write operation caused by an overhead.

To resolve the problem of the overhead incurred by the garbage collection, the log-structured file system may use a slack space recycling (SSR) method. Depend on the SSR method, when the system lacks consecutive spaces for storing data therein, the garbage collection is not performed. Instead, depend on the SSR method, the data is recorded in an invalid block of a dirty segment, thus delaying the garbage collection. Therefore, depend on the SSR method, deterioration in the write performance can be avoided. Since, however, the SSR method accompanies random write operations of a storage device, it may be more effective to perform the garbage collection rather than performing the SSR method in the aspect of improving the write performance.

As a conventional technology related to a file system that uses a garbage collection approach, Korean Patent Laid-open Publication No. 10-2013-0050124 (entitled "GARBAGE COLLECTION METHOD FOR NON-VOLATILE MEMORY DEVICE") describes an efficient garbage collection method capable of reducing an overhead by considering the number and the recording time of valid data blocks and, also by conducting a cost-benefit analysis in a non-volatile memory device.

In addition, Korean Patent Laid-open Publication No. 10-2011-0098279 (entitled "NAND FLASH MEMORY SYSTEM AND METHOD FOR PERFORMING GARBAGE COLLECTION BASED ON LOCALITY OF BUFFER") describes a method of performing a garbage collection method based on information of a buffer cache and a flash memory in consideration of locality of buffer, and, also, describes a flash memory system therefor.

SUMMARY

Example embodiments are conceived to solve the aforementioned problems and provide a method and an apparatus for performing partial garbage collection in consideration of an overhead in a file system.

However, the problems sought to be solved by the present disclosure are not limited to the above description and other problems can be clearly understood by those skilled in the art from the following description.

As a technical means for solving the above-described problem, in accordance with a first exemplary embodiment, there is provided a computing device. The computing device includes a storage device in which a program for operating a file system is stored; and a processor configured to execute the program stored in the storage device wherein, in response to execution of the program, if a write request upon a file to be stored in the storage device is generated, the processor calculates, based on one or more file write methods included in the file system, an overhead of each of the one or more write methods, selects a file write method having the smallest overhead among the one or more file write methods, and records the file in the storage device by using the selected file write method, the one or more file write methods include slack space recycling (SSR), internal-segment-copying-based garbage collection and external-segment-copying-based garbage collection, the internal-segment-copying-based garbage collection comprises performing garbage collection on a segment into which the file is to be copied; and the external-segment-copying-based garbage collection comprises performing garbage collection on a segment different from the segment into which the file is to be copied.

Further, in accordance with a second exemplary embodiment, there is provided a partial garbage collection method of a file system. The method includes receiving a write request upon a file to be stored in a storage device; calculating, based on one or more file write methods included in the file system, an overhead of each of the one or more write methods; selecting a file write method having the smallest overhead among the one or more file write methods; and recording the file in the storage device by using the selected file write method. wherein the one or more file write methods include slack space recycling (SSR), internal-segment-copying-based garbage collection and external-segment-copying-based garbage collection, the internal-segment-copying-based garbage collection comprises performing garbage collection on a segment into which the file is to be copied, and the external-segment-copying-based garbage collection comprises performing garbage collection on a segment different from the segment into which the file is to be copied.

According to the example embodiments described as above, by using whichever one of the slack space recycling method and the garbage collection method that accompanies little overhead, write performance upon the storage device can be improved. Furthermore, according to the example embodiments, by performing the checkpoint for the partial garbage collection method, data consistency can be maintained.

DETAILED DESCRIPTION

Figure 1:
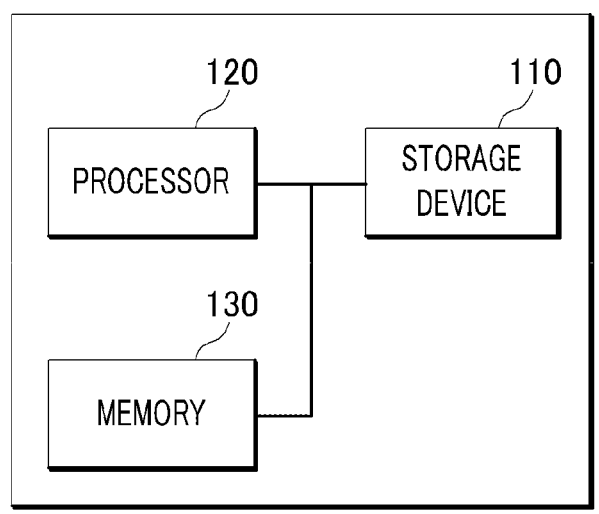
FIG. 1 is a configuration view of a computing device according to an example embodiment.

Hereinafter, example embodiments will be described in detail so that inventive concept may be readily implemented by those skilled in the art. However, it is to be noted that the present disclosure is not limited to the example embodiments and examples but can be realized in various other ways. In drawings, parts not directly relevant to the description are omitted to enhance the clarity of the drawings, and like reference numerals denote like parts through the whole document.

Through the whole document, the terms "connected to" or "coupled to" are used to designate a connection or coupling of one element to another element and include both a case where an element is "directly connected or coupled to" another element and a case where an element is "electronically connected or coupled to" another element via still another element. Further, through the whole document, the term "comprises or includes" and/or "comprising or including" used in the document means that one or more other components, steps, operation and/or existence or addition of elements are not excluded in addition to the described components, steps, operation and/or elements unless context dictates otherwise.

FIG. 1 is a configuration view of a computing device 100 according to an example embodiment.

As depicted in FIG. 1, the computing device 100 according to the example embodiment includes a storage device 110 and a processor 120.

Here, the computing device 100 may include general computers such as a server, a workstation, a desktop computer and a notebook computer, and a smart device such as a smartphone and a tablet PC.

Further, the storage device 110 stores therein programs for operating a file system. Here, the storage device 110 may be implemented by a flash memory such as a compact flash (CF) card, a SD card, a memory stick, a solid-state drive or a micro SD card.

The computing device 10 may further include a memory 130.

The memory 130 is a generic term that refers to a volatile memory. The processor 120 is configured to upload a file stored in the storage device 110 onto the memory 130 and update it. By way example, the memory 130 may implemented by a DRAM (dynamic random access memory) such as a FPM DRAM (fast page mode DRAM), an EDO DRAM (extended data out DRAM), a SDRAM (synchronous DRAM), a DDR a SDRAM (double data rate SDRAM), a DDR2 SDRAM (double data rate 2 SDRAM), a DDR3 SDRAM (double data rate 3 SDRAM), or the like, or a SRAM (static random access memory) such as a bipolar SRAM, a CMOS SRAM or the like.

Meanwhile, the processor 120 carries out a file write request onto the storage device 110 to generate a new file and store it in the storage device 110. Further, after the processor 120 loads a file previously stored in the storage device 110 onto the memory 130, if a part of this file is updated, the processor 120 carries out a file write request and reflects the result on the storage device 110.

First, if a write request upon a file to be stored in the storage device 110 is made in response to execution of a program, the processor 120 calculates, based on at least one or more file write methods included in the file system, an overhead of each of the file write methods for writing the file on the storage device 110. Then, if the overheads are calculated, the processor 120 selects a file write method having the smallest overhead and records the file on the storage device 110 by using the selected file write method.

Here, the file system is based on a F2FS (flash-friendly file system). The F2FS is one of log-structured file systems. The F2FS is a file system designed to be suitable for the characteristics of a flash memory.

The processor 120 manages metadata and data separately based on the F2FS. The processor 120 stores the metadata in a super block, a checkpoint area, a SIT (segment information table), a SSA (segment summary area) and a NAT (node address table) at the front portion of the file system by using an in-place update mechanism.

Further, the processor 120 stores the data sequentially in segments on a main area thereof. At this time, the data can be sorted into three types to be stored in three different types of segments: hot, warm and cold. If garbage collection is performed, the processor 120 makes a decision that a copied solid block is not frequently updated, and moves the block into a cold segment. Further, the processor 120 also performs a checkpoint to maintain consistency of the data based on the F2FS.

Moreover, the processor 120 may use a slack space recycling (SSR) method and a garbage collection method as a file write method.

Now, a file write method according to the example embodiment will be described with reference to FIG. 2A to FIG. 2C.

Figure 2A:
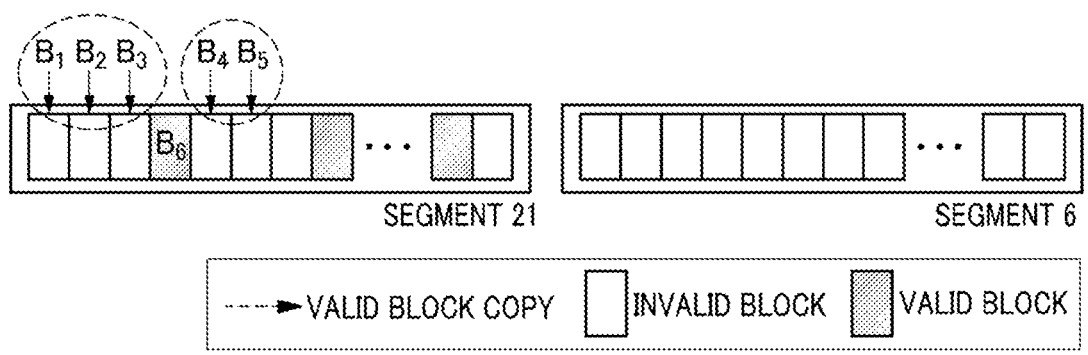
FIG. 2A to FIG. 2C are diagrams illustrating a file write method according to the example embodiment.
Figure 2B:
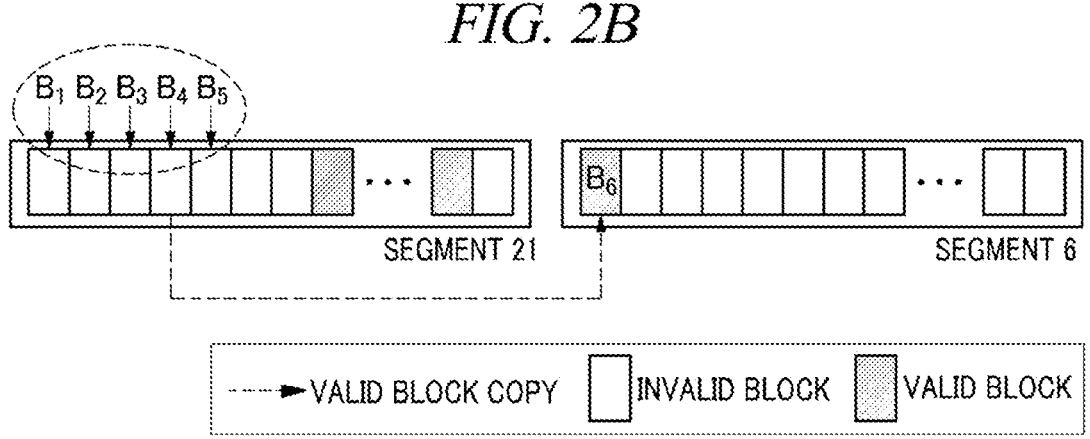
Figure 2C:
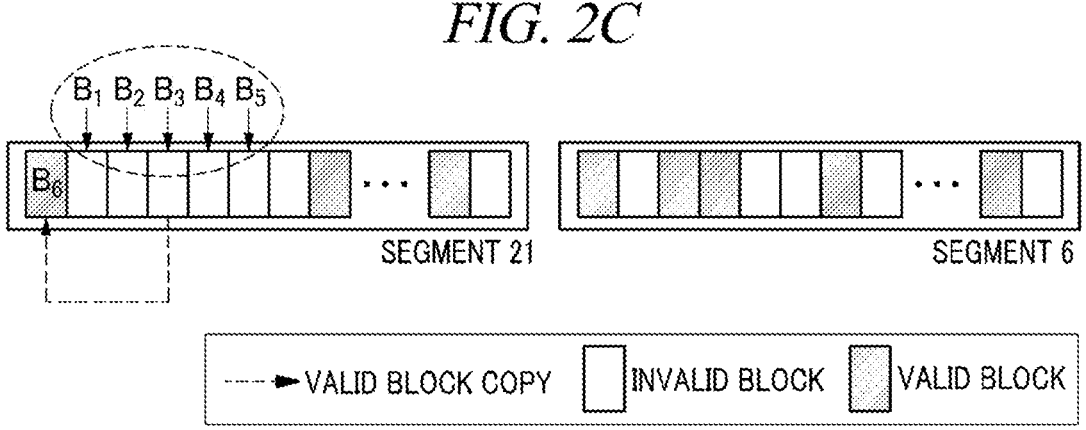

FIG. 2A to FIG. 2C are diagrams illustrating a file write method according to the example embodiment.

FIG. 2A is an example diagram illustrating the file write method according to the example embodiment. Referring to FIG. 2A, when data "B1" to "B5" are included in a file to be stored in the storage device 110, the processor 120 is capable of storing the data sequentially in invalid blocks of "Segment 21". If, however, a valid block "B6" is already stored in a middle portion of the "Segment 21," five consecutive blocks for storing therein the data included in the target file cannot be obtained. In this case, the processor 120 may divide the data into "B1" to "B3" and "B4 and B5" in consideration of the valid blocks that exist within the "Segment 21." That is, when performing the SSR method as shown in FIG. 2A, the write request is carried out two times.

In FIG. 2A, if the data "B6" is moved to another segment by using the garbage collection method, the file system is capable of securing sufficient space for the storage of the data "B1" to "B5," and, thus, a sequential write operation can be performed by carrying out the write request only one time.

The garbage collection method of the file system includes internal segment copying and external segment copying. Here, the internal segment copying is to perform garbage collection in a segment into which a file is to be copied. Meanwhile, the external segment copying is to perform garbage collection in a segment different from the segment into which the file is to be copied. At this time, the different segment may be a cold segment.

FIG. 2B shows an example of the external segment copying, and FIG. 2C depicts an example of the internal segment copying.

Referring to FIG. 2B, the processor 120 may perform garbage collection of moving the "B6" in the middle portion of the "Segment 21" into an invalid block of "Segment 6" based on the external segment copying. After the garbage collection based on the external segment copying is performed, five consecutive invalid blocks for storing five blocks therein can be secured in the "Segment 21."

Referring to FIG. 2C, the processor 120 may perform garbage collection of moving the "B6" in the middle portion of the "Segment 21" into an invalid block of the "Segment 21" itself based on the internal segment copying. To elaborate, the processor 120 moves the "B6" into any one of invalid blocks of the "Segment 21" in consideration of the number of blocks to be stored in the "segment 21." After the garbage collection based on the internal segment copying is performed, five consecutive invalid blocks for storing five blocks therein can be secured in the "Segment 21," the same as in the case of the external segment copying.

Meanwhile, the processor 120 calculates an overhead to select either one of the SSR method and the garbage collection method. Here, the overhead may be a processing time required to perform the SSR method or the garbage collection method.

If overheads of the two methods are calculated, the processor 120 may compare an overhead of the internal segment copying and an overhead of the external segment copying for the selection of the garbage collection. If the overhead of the internal segment copying is larger than the overhead of the external segment copying, the processor 120 may select the external segment copying as the garbage collection method. On the contrary, if the overhead of the internal segment copying is smaller than the overhead of the external segment copying, the processor 120 may select the internal segment copying as the garbage collection method.

At this time, the overhead of the SSR method can be calculated as a time taken to store a file in each valid block of a segment. When there exist consecutive invalid blocks having sizes of $H_{Left}$ and $H_{Right}$ in a certain segment, an overhead $T_{Sequential}$ of the SSR method is represented by the following Equation 1.

$$T_{Sequential}(H_L, H_R) = H_L \cdot T_w(H_L) + H_R \cdot T_w(H_R) \quad \text{[Equation 1]}$$

Here, in Equation 1, $T_r(n)$ denotes a time required to process a read request upon a single block when processing read requests upon n number of blocks as a single read request. Further, $T_w(n)$ denotes a time required to process a write request upon a single block when processing write requests upon n number of blocks as a single write request.

Referring to Equation 1, an overhead of the SSR method can be calculated as the sum of a time required to process a user write on $H_{Left}$ number of consecutive invalid blocks and a time required to process a user write on $H_{Right}$ number of consecutive invalid blocks.

Furthermore, an overhead of the external segment copying can be calculated based on the number of valid blocks included in a segment in which a file is to be stored and, also, the average size of an empty space within a segment different from the segment in which the file is to be stored. Thus, the overhead $T_{External}$ of the external segment copying may be represented by the following Equation 2.

$$T_{External}(H_{Left}, H_{Right}, B_{valid}, H_{avg}^{External}) = (H_{Left} + H_{Right}) \cdot T_w(H_{Left} + H_{Right} + B_{valid}) + B_{valid} \cdot T_r(B_{valid}) + B_{valid} \cdot T_w(H_{avg}^{External}) \quad \text{[Equation 2]}$$

Referring to Equation 2, in the external segment copying, if $B_{valid}$ number of invalid blocks are generated by copying $B_{valid}$ number of valid blocks in the segment in which the file is to be stored, a write space having a size of $H_{Right} + B_{valid} + H_{left}$ can be secured. Accordingly, write requests from a user upon $H_{Right} + H_{left}$ number of valid blocks can be processed as a single write request, and a write time may be $T_w(H_{left} + H_{Right} + B_{valid})$.

Further, an overhead for converting the $B_{valid}$ number of invalid blocks to the invalid blocks can be calculated as the sum of the time $B_{valid} \cdot T_r(B_{valid})$ required to read the $B_{valid}$ number of blocks and the time $B_{valid} \cdot T_w(H_{avg}^{External})$ required to write the file in an external cold segment on which external segment write will be performed. Here, $H_{avg}^{External}$ denotes the average size of consecutive invalid blocks of the external cold segment.

Furthermore, an overhead of the internal segment copying can be calculated based on the number of valid blocks included in the segment in which the file is to be stored and, also, the average size of an empty space within the segment in which the file is to be stored. Specifically, the overhead $T_{Internal}$ of the internal segment copying may be represented by the following Equation 3.

$$T_{Internal}(H_L, H_R, B_{valid}, H_{avg}^{Internal}) = (H_L + H_R) \cdot T_w(H_L + H_R) + B_{valid} \cdot T_r(B_{valid}) + B_{valid} \cdot T_w(H_{avg}^{Internal}) \quad \text{[Equation 3]}$$

Referring to Equation 3, the overhead of the internal segment copying can be calculated in a similar way to the calculation of the overhead of the external segment copying. After garbage collection is applied, a checkpoint needs to be carried out. Write requests upon $B_{valid}$ number of blocks are processed while carrying out the checkpoint, before the write requests from the user is processed. Accordingly, even in case of processing the write requests within a single segment, a write request upon $H_L + H_R$ and a write request upon cannot be integrated but are processed separately.

Furthermore, a time taken to read the file in an internal segment on which internal segment write will be performed can be calculated as the sum of the time $B_{valid} \cdot T_r(B_{valid})$ taken to read the $B_{valid}$ number of blocks and the time $B_{valid} \cdot T_w(H_{avg}^{Internal})$ taken to store the $B_{valid}$ number of blocks in the segment. Here, $H_{avg}^{Internal}$ denotes the average size of the empty space within the internal segment in which the file is to be stored.

Meanwhile, the processor 120 compares the overhead required to perform the SSR method and the overhead required to perform the garbage collection method, and, based on the comparison result, the processor 120 selects a file write method. If the overhead required to perform the SSR method is larger than the overhead required to perform the garbage collection method, the processor 120 may select the garbage collection method as a file write method.

Here, the processor 120 needs to carry out a checkpoint to implement the garbage collection method. Thus, an overhead of the garbage collection method can be calculated based on the overhead required to perform the garbage collection and an overhead required to carry out the checkpoint.

Here, if there occurs a failure in a writing operation while the file is being written, the processor 120 may carry out a checkpoint to maintain consistency of the storage device 110 and the file system. The checkpoint will be elaborated with reference to FIG. 3A to FIG. 3C.

Figure 3A:
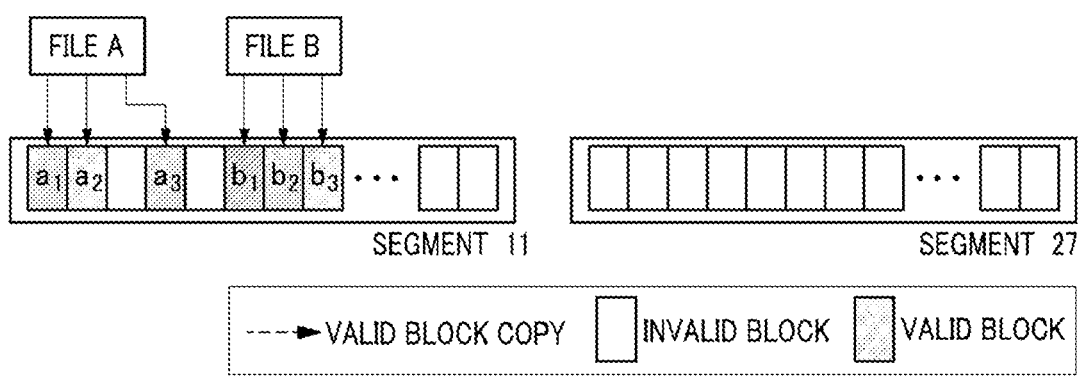
FIG. 3A to FIG. 3C are diagrams illustrating an example of a checkpoint according to an example embodiment.
Figure 3B:
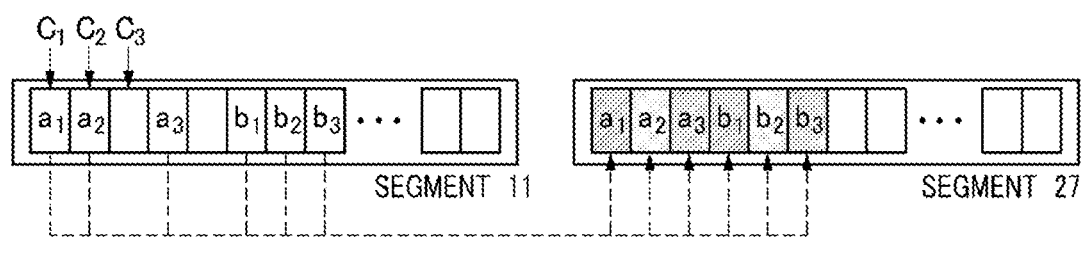
Figure 3C:
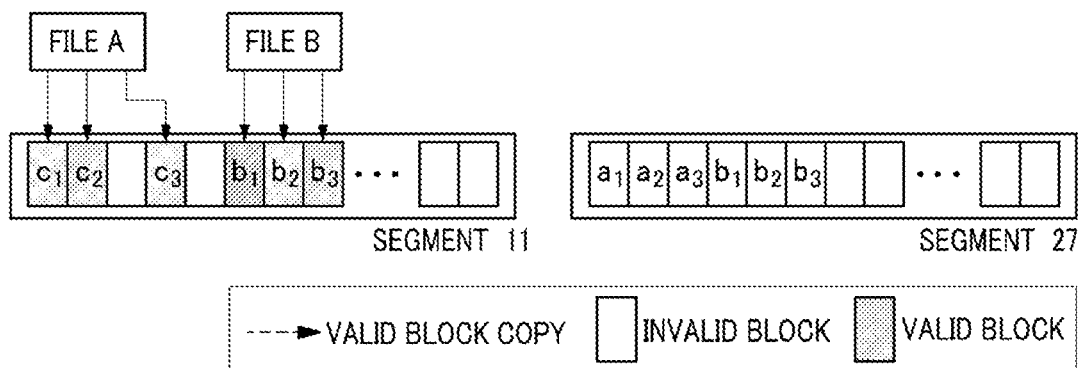

FIG. 3A to FIG. 3C are diagrams illustrating an example of a checkpoint according to an example embodiment.

FIG. 3A illustrates a state after a checkpoint is performed when "File A" is stored in blocks "a1" to "a3" of "Segment 11" and file "B" is stored in blocks "b1" to "b3" of "Segment 11."

As shown in FIG. 3B, the processor 120 may perform garbage collection to store blocks "c1" to "c3" after the checkpoint is performed. Through this operation, the blocks "a1" to "a3" and the blocks "b1" to "b3" of the "Segment 11" can be all moved into invalid blocks of the "Segment 27." Accordingly, the valid blocks in which the blocks "a1" to "a3" and the blocks "b1" to "b3" were stored become invalid blocks. Then, the processor 120 stores the blocks "c1" to "c3" in the invalid blocks of the "Segment 11."

If the system is suddenly shut down or suffers from an error after the "c1" to "c3" are stored in the "Segment 11," the processor 120 may restore the file system based on the finally checkpointed state. Since, however, the processor 120 has not performed a checkpoint after the blocks "c1" to "c3" are stored in the "Segment 11," modified metadata is not stored as shown in FIG. 3C. That is, since the "File A" indicates the "c1" and "c2" of the "Segment 11" instead of the "a1" and "a2" of the "Segment 27," consistency of the file system may be broken.

As in the example of FIG. 3A to FIG. 3C, to maintain the consistency of the file system, a checkpoint needs to be performed after the garbage collection is performed. Thus, the processor 120 may calculate an overhead of the garbage collection method based on an overhead required to perform the checkpoint and an overhead required to perform the garbage collection. For example, the overhead of the garbage collection method may be calculated as the sum of the overhead taken to perform the checkpoint and the overhead taken to perform the garbage collection.

As stated above, the processor 120 is capable of calculating the overheads for the respective cases of performing the SSR methods and the garbage collection method. Then, the processor 120 is also capable of selecting the file write method accompanying smallest overhead by comparing the overhead of the SSR method and the overhead of the garbage collection method.

Below, referring to FIG. 4 and FIG. 5, a partial garbage collection method of the file system according to the example embodiment will be described.

Figure 4:
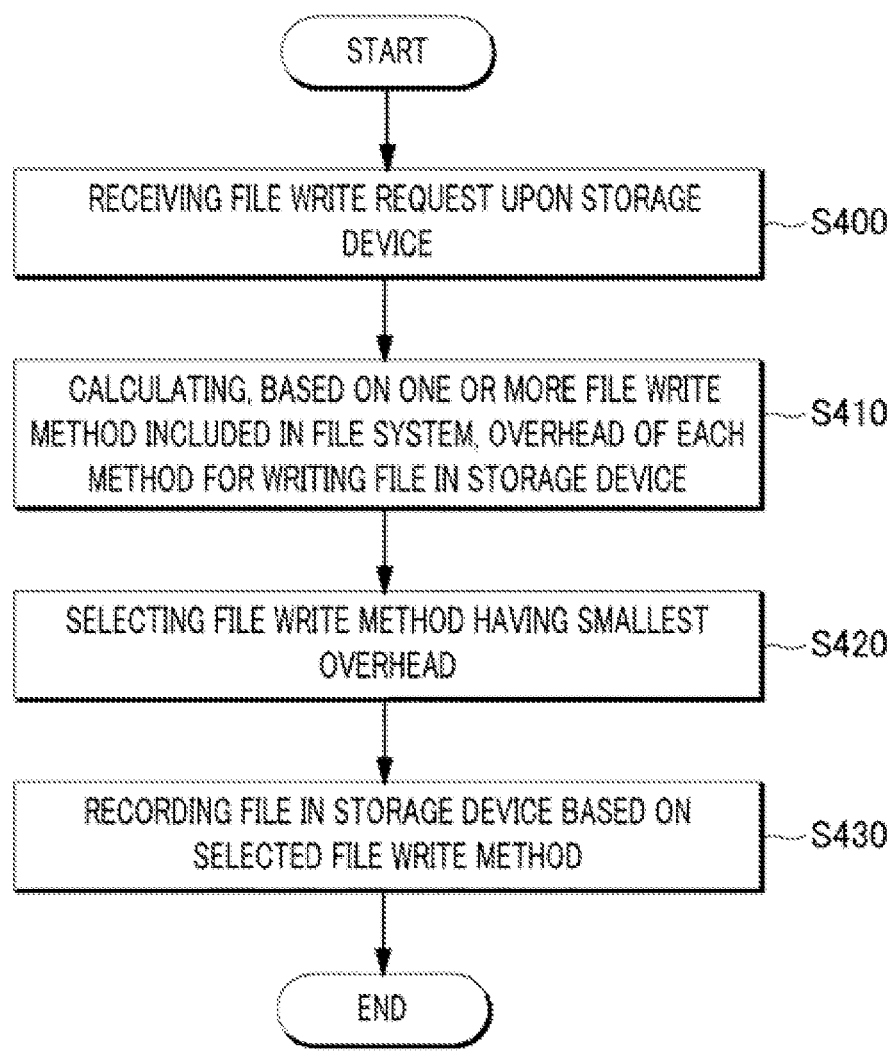
FIG. 4 is a flowchart for describing a partial garbage collection method according to the example embodiment.

FIG. 4 is a flowchart for describing the partial garbage collection method of the computing device 100 according to the example embodiment.

As depicted in FIG. 4, if a write request upon a file to be stored in the storage device 110 is generated (S400), the computing device 100 according to the example embodiment calculates, based on one or more file write methods included in the file system, overheads of the one or more file write methods for writing the file in the storage device 110 (S410).

Here, the file write methods include a slack space recycling (SSR) method and a garbage collection method.

The garbage collection method includes internal segment copying and external segment copying. The internal segment copying is to perform garbage collection upon a segment in which a file is to be copied. The external segment copying is to perform garbage collection upon a segment different from the segment in which the file is to be copied. At this time, the different segment may be a cold segment.

The computing device 100 selects, based on the calculated overheads, a file write system that accompanies the smallest overhead (S420). Here, the overhead may refer to a processing time required to perform the SSR method or the garbage collection method.

If the file write method is chosen, the computing device 100 records the file in the storage device 110 based on the selected file write method (S430).

Figure 5:
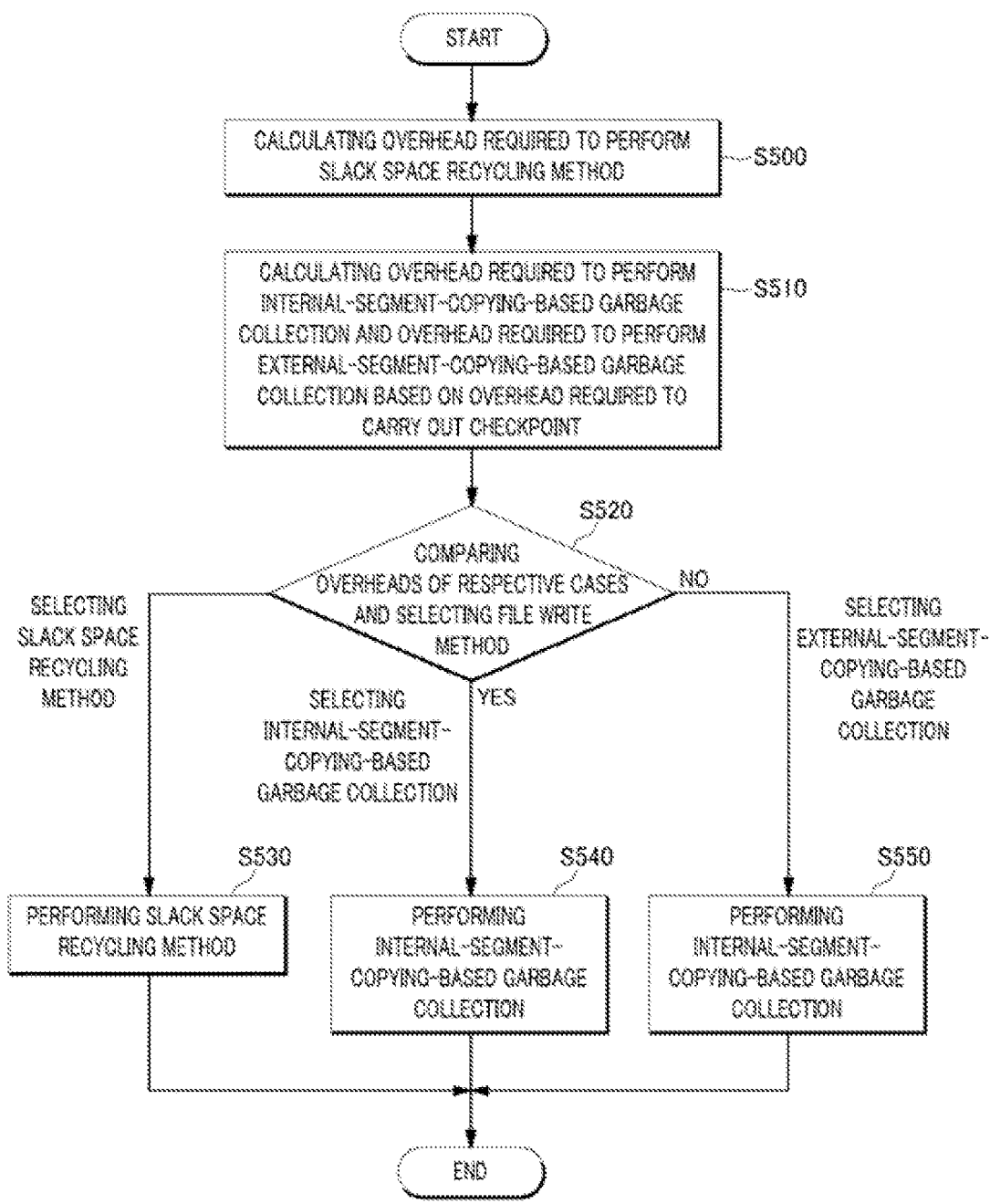
FIG. 5 is a flowchart for describing selection of a file write method according to the example embodiment.

FIG. 5 is a flowchart for elaborating a method of selecting the file write method according to the example embodiment.

As shown in FIG. 5, in order to select the file write method accompanying the smallest overhead, the computing device 100 may calculate an overhead for performing the SSR method (S500). Further, the computing device 100 may also calculate an overhead of the internal segment copying and an overhead of the external segment copying in consideration of an overhead for conducting a checkpoint (S510).

After calculating the overheads of the respective cases, the computing device 100 may compare the overhead required to perform the SSR method and the overheads required to perform the garbage collection method based on the internal segment copying and the external segment copying (S520).

Here, if the overhead required to perform the SSR method is larger than the overheads required to perform the garbage collection method, the computing device 100 may select the garbage collection method as the file write method. Then, the computing device 100 may write a file by using the garbage collection method (S530).

If the overhead of the garage collection method based on the external segment copying is the smallest, the computing device 100 may select the garbage collection based on the external segment copying as the file write method. Then, the computing device 100 may perform garbage collection based on the external segment copying as the file write method (S540).

Meanwhile, if the overhead of the garage collection method based on the external segment copying is the smallest, the computing device 100 may select the garbage collection based on the external segment copying as the file write method. Then, the computing device 100 may perform garbage collection based on the external segment copying as the file write method (S540).

In the computing device and the partial garbage collection method according to the example embodiment, by selecting a method accompanying a small overhead among the SSR method and the garbage collection methods, write performance upon the storage device 110 can be improved. Furthermore, according to the example embodiment, by performing a checkpoint for the partial garbage collection method, consistency of data can be maintained.

The example embodiments can be embodied in a storage medium including instruction codes executable by a computer or processor such as a program module executed by the computer or processor. A computer readable medium can be any usable medium which can be accessed by the computer and includes all volatile/nonvolatile and removable/non-removable media. Further, the computer readable medium may include all computer storage and communication media. The computer storage medium includes all volatile/nonvolatile and removable/non-removable media embodied by a certain method or technology for storing information such as computer readable instruction code, a data structure, a program module or other data. The communication medium typically includes the computer readable instruction code, the data structure, the program module, or other data of a modulated data signal such as a carrier wave, or other transmission mechanism, and includes information transmission mediums.

The method and the system of the present disclosure have been described with respect to the example embodiment. However, a part or all of the constituent parts or operations of the present disclosure may be implemented by using a computer system having general-purpose hardware architecture.

The above description of the illustrative embodiments is provided for the purpose of illustration, and it would be understood by those skilled in the art that various changes and modifications may be made without changing technical conception and essential features of the illustrative embodiments. Thus, it is clear that the above-described illustrative embodiments are illustrative in all aspects and do not limit the present disclosure. For example, each component described to be of a single type can be implemented in a distributed manner. Likewise, components described to be distributed can be implemented in a combined manner.

The scope of the inventive concept is defined by the following claims and their equivalents rather than by the detailed description of the illustrative embodiments. It shall be understood that all modifications and embodiments conceived from the meaning and scope of the claims and their equivalents are included in the scope of the inventive concept.

We claim:

1. A computing device, comprising:
a storage device in which a program for operating a file system is stored; and
a processor configured to execute the program stored in the storage device, wherein
in response to execution of the program, when a write request upon a file to be stored in the storage device is generated, the processor:
calculates an overhead to be incurred for a file to be stored using a first file write method included in the file system, and an overhead to be incurred for the file to be stored using a second file write method included in the file system, where the overhead of the second file write method comprises calculating a processing time to conduct a checkpoint based on a first copying method of the second file write method, and a processing time to conduct a checkpoint based on a second copying method of the second file write method,
selects a file write method from among the file write methods that corresponds to a smallest overhead among the calculated overheads, and
records the file in the storage device by using the selected file write method,
wherein the file write methods include slack space recycling (SSR), internal-segment-copying-based garbage collection, and external-segment-copying-based garbage collection,
wherein the internal-segment-copying-based garbage collection comprises performing garbage collection on a segment into which the file is to be copied, and
wherein the external-segment-copying-based garbage collection comprises performing garbage collection on a segment different from the segment into which the file is to be copied.

2. The computing device of claim 1, wherein the processor calculates an overhead of the internal-segment-copying-based garbage collection and an overhead of the external-segment-copying-based garbage collection based on the processing time required to carry out the checkpoint on the storage device.

3. The computing device of claim 1, wherein the processor calculates the overhead of the internal-segment-copying-based garbage collection based on the number of valid blocks included in the segment into which the file is to be copied and an average size of an empty space within the segment into which the file is to be copied.

4. The computing device of claim 1, wherein the processor calculates the external-segment-copying-based garbage collection based on the number of valid blocks included in the segment into which the file is to be copied and an average size of an empty space within one or more segments different from the segment in which the file is to be copied.

5. The computing device of claim 1, wherein the overhead includes a processing time.

6. The computing device of claim 1, wherein the processor calculates the respective overheads by adding an overhead expected to be incurred by performing garbage collection and the processing time required to carry out the checkpoint.

7. A partial garbage collection method of a file system, comprising:
receiving a write request upon a file to be stored in a storage device;
calculating, based on file write methods included in the file system, an overhead to be incurred for a file to be stored using a first file write method included in the file system, and an overhead to be incurred for the file to be stored using a second file write method included in the file system, where the overhead of the second file write method comprises calculating a processing time to conduct a checkpoint based on a first copying method of the second file write method, and a processing time to conduct a checkpoint based on a second copying method of the second file write method, and;
selecting a file write method from among the file write methods corresponding to a smallest overhead among the calculated overheads; and
recording the file in the storage device by using the selected file write method,
wherein the file write methods include slack space recycling (SSR), internal-segment-copying-based garbage collection and external-segment-copying-based garbage collection,
wherein the internal-segment-copying-based garbage collection comprises performing garbage collection on a segment into which the file is to be copied, and
wherein the external-segment-copying-based garbage collection comprises performing garbage collection on a segment different from the segment into which the file is to be copied.

8. The partial garbage collection method of claim 7, wherein the selecting of the file write method comprises calculating an overhead of the internal-segment-copying-based garbage collection and an overhead of the external-segment-copying-based garbage collection based on a processing time required to carry out the checkpoint on the storage device.

9. A computing device, comprising:
a storage device in which a program for operating a file system is stored; and
a processor configured to execute the program that is stored in the storage device, wherein, in response to execution of the program, when a write request upon a file to be stored in the storage device is generated, the processor:

calculates, based on file write methods included in the file system, an overhead to be incurred for a file to be stored using a first file write method included in the file system, and an overhead to be incurred for the file to be stored using a second file write method included in the file system, where the overhead of the second file write method comprises calculating a processing time to conduct a checkpoint based on a first copying method of the second file write method, and a processing time to conduct a checkpoint based on a second copying method of the second file write method, selects a file write method from among the file write methods corresponding to a smallest overhead among the calculated overheads, and records the file in the storage device by using the selected file write method, and wherein the file write methods include an internal-segment-copying-based garbage collection which comprises performing garbage collection on a segment into which the file is to be copied, and an external-segment-copying-based garbage collection which comprises performing garbage collection on a segment different from the segment into which the file is to be copied.

10. The computing device of claim 6, wherein the checkpoint is performed after performing the internal-segment-copying-based garbage collection or the external-segment-copying-based garbage collection.

11. The computing device of claim 10, wherein the file system is restored based on the checkpoint in response to a shutdown of the file system or an error of the file system.

* * * * *